July 13, 1965

N. E. SINDLINGER 3,194,343

SPRING MOTOR

Filed May 4, 1964

INVENTOR.
NORMAN E. SINDLINGER
BY
*Busser Smith & Hardy*

ATTORNEYS

United States Patent Office 3,194,343
Patented July 13, 1965

3,194,343
SPRING MOTOR
Norman E. Sindlinger, Medford Lakes, N.J., assignor to Ametek, Inc., New York, N.Y., a corporation of Delaware
Filed May 4, 1964, Ser. No. 364,619
18 Claims. (Cl. 185—10)

This invention relates to a motor of the spring type and more particularly relates to such a motor which can exert a plurality of substantially different and substantially constant forces over a very long stroke.

In many applications, it is desirable to have a spring motor which can produce a number of different forces which are relatively constant. Further, in many such applications it is desirable to have a relatively constant force over a long stroke and to be able to vary the force while the motor is under load and without movement of the output means. All of these desired ends are achieved by the spring motor of this invention.

Relative to the prior art, tightly coiled non-cumulative force ribbon springs are well known and are in wide commercial use. Such springs are disclosed in United States Patents No. 2,609,191 and No. 2,609,192, both issued on September 2, 1952. Further, it is known to employ such springs to make an "A" motor by coiling such a spring directly onto a pair of spaced drums as disclosed in FIGURE 11 of Patent No. 2,647,743, issued August 4, 1953. Such a spring may also be used to make a "B" motor by coiling it directly on one drum and reverse winding it onto a spaced second drum (see Patent No. 2,063,799, issued November 8, 1936). Such motors as used commercially generally have a zero or very small gradient and are not capable of producing abrupt and substantial changes in the output force when under load and without movement of the associated output means.

In my application Serial Number 364,620 filed concurrently herewith and incorporated by reference as a part hereof, I have disclosed a variable force "A" or "B" motor employing a tapered tightly coiled non-cumulative force ribbon spring in which the force can be varied without movement of the output means. Such tapered springs are disclosed in Patent No. 2,609,193, issued September 2, 1952.

This invention and its objects will be further clarified on reading the following description in conjunction with the drawings, in which.

Figure 1:
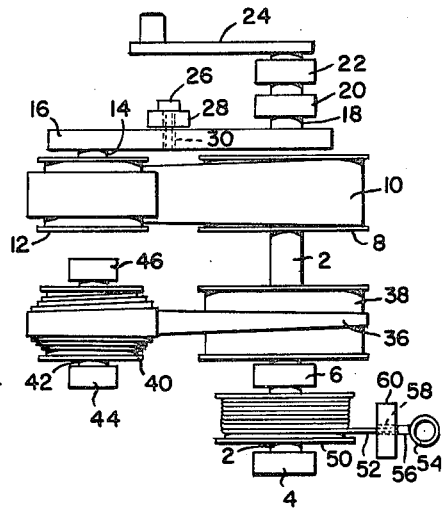
FIGURE 1 is a diagrammatic plan view of a device embodying the invention.

Referring to FIGURE 1, a shaft 2 is rotatably mounted in support members 4 and 6. An output drum 8 is fixedly secured to shaft 2 and has reversely wound thereon the leading portion of a tapered non-cumulative force ribbon spring 10, the major portion of which is tightly coiled on a storage drum 12. Storage drum 12 is fixedly secured to a shaft 14 which is mounted for rotation in a lever 16. The structure as thus descrbed is, in effect, a "B" motor having a substantial negative gradient due to spring 10 being tapered from its inner end to its leading end which is substantially wider than the inner end.

Lever 16 is fixedly secured to a shaft 18 which is mounted for rotation in support members 20 and 22. A crank 24 is fixedly secured to shaft 18. A headed stop pin 26 passes through a fixed bracket 28 and is adapted to engage an opening 30 in lever 16 to secure lever 16 in a fixed position.

A tapered non-cumulative force ribbon spring 36 tapering from a wide inner end to a narrower leading end has its leading end reversely wound onto and secured to output drum 38 with the remainder of the spring tightly coiled onto storage drum 40 which is fixedly secured to a shaft 42 mounted for rotation in support members 44 and 46. This structure constitutes a second "B" motor which, due to the taper of spring 36 has a positive gradient which is equal and opposite to the gradient of spring 10.

A drum 50 has coiled thereon a cable 52 which has a looped end 54 secured by a clamp 56 which is too large to pass through an opening 58 in a fixed bracket 60 through which cable 52 passes.

Operation

Figure 2:
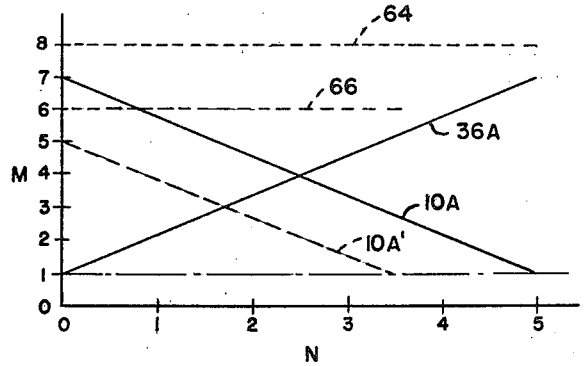
FIGURE 2 is a graph of the torques of a typical device having the design of the device of FIGURE 1.

Referring now to the graph of FIGURE 2, the torque M in pound inches is plotted against the number of turns N of shaft 2. Assuming that springs 10 and 36 are of sufficient length so that shaft 2 can be rotated five turns to backwind springs 10 and 36 on their respective output drums 8 and 38, line 10A is a plot of the torque against the number of turns of shaft 2 for the "B" motor associated with spring 10 while line 36A is a plot of the same for the "B" motor associated with spring 36. As seen from the graph, the gradient of the output force of the "B" motor associated with spring 10 is negative while the gradient of the output force of the "B" motor associated with spring 36 is positive, being equal to but opposite to the first mentioned gradient. Thus, the sum of the torques will always be the same irrespective of the amount of rotation of shaft 2 by the extension of cable 52, namely eight pound inches as shown by broken line 64 in FIGURE 2. Thus, as cable 52 is extended to cause the rotation of shaft 2 which in turn causes the reverse winding of springs 10 and 36 onto their respective drums 8 and 38, the torque exerted remains the same irrespective of whether shaft 2 has been rotated one, two, three, four or five turns or any fraction thereof.

When it is desired to change the tensioning force exerted on cable 52, pin 26 is withdrawn from lever 16 and crank 24 is rotated to in turn cause the rotation of storage drum 12 bodily about the axis of output drum 8 to either transfer more of the spring 10 from drum 12 to drum 8 or to accomplish the reverse. Assuming the parts to be in the positions shown in FIGURE 1 with a torque of 8 pound inches being exerted, the rotation of drum 12 bodily about drum 8 to transfer more of spring 10 from drum 12 to drum 8 will shift the gradient line 10A downwardly to, for example, the position shown by line 10A'. This will result in a net torque of 6 pound inches. The sum of the torques of lines 10A and 36A is plotted by the line 66. The reduction in the sum of the torques thus achieved reduces the effective length of spring 10 and thus obviously results in reducing the total number of turns which shaft 2 can make in winding up the "B" motors and similarly the length to which cable 52 can be extended. It will be clear that such a variation in the sum of the torques of the "B" motors can be made irrespective of the point of extension of cable 52 limited only by the length of the spring 10. The variations in the force exerted by the "B" motor associated with spring 10 can be accomplished in many ways as is illustrated in my application filed concurrently herewith. It will be clear, too, that the force variations can be accomplished by varying the relationship of the turns to the drums of the positive gradient "B" motor if desired.

Figure 3:
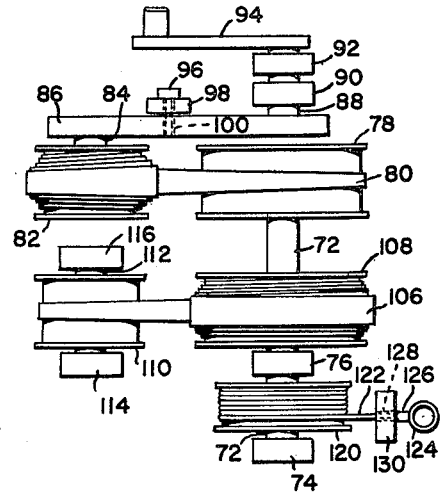
FIGURE 3 is a diagrammatic plan view of an alternative device embodying the invention.

A different embodiment of the invention is shown in FIGURE 3. Here a shaft 72 is rotatably mounted in support members 74 and 76 and has fixedly secured thereto an output drum 78. A non-cumulative force ribbon spring 80 which is set to a constant radius, has its leading end backwound onto drum 78 and the remainder tightly coiled onto a storage drum 82. Spring 80 is tapered throughout its length being relatively narrow at its leading end and relatively wide at its inner end to provide a positive gradient. This structure constitutes a "B" motor.

Storage drum 82 is fixedly secured to a shaft 84 which is rotatably mounted on a lever 86 which in turn is fixedly secured to a shaft 88 mounted for rotation in support members 90 and 92. A crank 94 is fixedly secured to shaft 88. A stop pin 96 passes through a bracket 98 and engages an opening 100 in lever 86.

A non-cumulative force ribbon spring 106 which is set to a constant radius is backwound onto output drum 108 and tightly coiled on a storage drum 110. Spring 106 is tapered throughout its length being relatively wide at the leading end and relatively narrow at the inner end to provide a negative gradient which is equal but of course opposite to the gradient provided by spring 80. With the position of the parts as shown in FIGURE 3, the bulk of spring 106 is prewound onto output drum 108. Storage drum 110 is fixedly secured to a shaft 112 which is mounted for rotation in support members 114 and 116. This structure constitutes a second "B" motor.

A drum 120 is fixedly secured to shaft 72 and has a cable 122 coiled thereon. Cable 122 has a looped end 124 secured by a clamp 126 which is too large to pass through opening 128 in fixed bracket 130 through which cable 122 passes.

Operation

As cable 122 is extended and unreeled from drum 120, the rotation of shaft 72 causes the winding of spring 80 onto output drum 78 and the unwinding of spring 106 from output drum 108. The gradient of the "B" motor associated with spring 80 is positive while the gradient of the "B" motor associated with spring 106 is equal thereto but negative. Thus, here again as in the case of the embodiment of FIGURE 1, the sum of the torques of the "B" motors associated with springs 80 and 106 will be constant. However, in this instance, the torques are opposed one to the other, the torque of the "B" motor associated with spring 106 being subtracted from the torque exerted by the "B" motor associated with spring 80.

Figure 4:
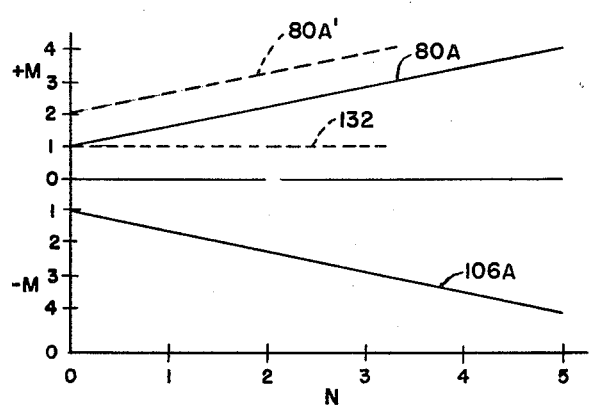
FIGURE 4 is a graph of the torque of a typical device embodying the design of the device of FIGURE 3.

A typical situation is illustrated in FIGURE 4, where line 80A is a plot of the torque of the "B" motor associated with spring 80 and line 106A is a plot of the torque of the "B" motor associated with spring 106. As will be evident from FIGURE 4, the extension of cable 122 and the consequent rotation of drums 78 and 108 result in a constant zero torque. The ability of this embodiment to be set so that it has a zero torque is one of its principal advantages.

If it is desired to provide for a positive torque which will act to rewind cable 122 onto drum 120, pin 96 is withdrawn from lever 86 and with crank 94, lever 86 is rotated to bodily rotate storage drum 82 about output drum 78 to transfer the desired amount of spring 80 from drum 82 to output drum 78 and thus increase the torque exerted by the "B" motor associated with spring 80. A typical example is illustrated in FIGURE 4, where broken line 80A' plots the torque of the "B" motor associated with spring 80 when sufficient spring has been transferred from storage drum 82 to output drum 78 so that a torque of 2 pound inches is produced with the apparatus in the position shown in FIGURE 3, i.e. at zero rotation of shaft 72. Broken line 132 represents the net torque produced by the sum of the torques plotted by line 106A and the new line 80A'. In this case, the sum will be constant at one pound and the stroke of cable 122 will be reduced due to the prewinding of a portion of the length of spring 80 onto drum 78.

Figure 5:
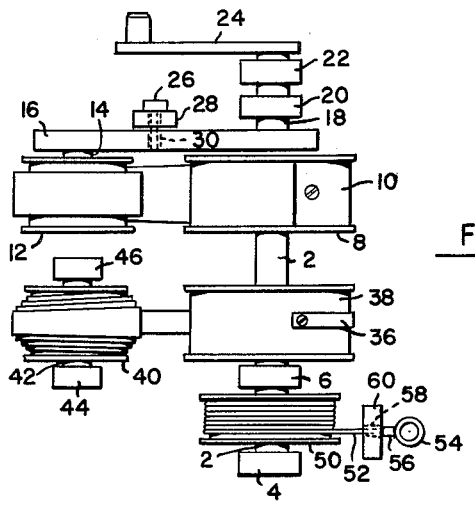
FIGURE 5 is a diagrammatic plan view of an alternative embodiment of the invention.

While only "B" motor forms have been discussed above, it will be evident that other spring motor forms may be employed. Thus, for example, an "A" motor may be employed as illustrated in FIGURE 5. Here the structure is identical with that disclosed in FIGURE 1 with with corresponding numerals being employed, the only difference being that springs 10 and 36 in lieu of being backwound onto output drums 8 and 38, respectively, as in the conventional "B" motor form are directly wound onto these drums in a conventional "A" motor form.

Figure 6:
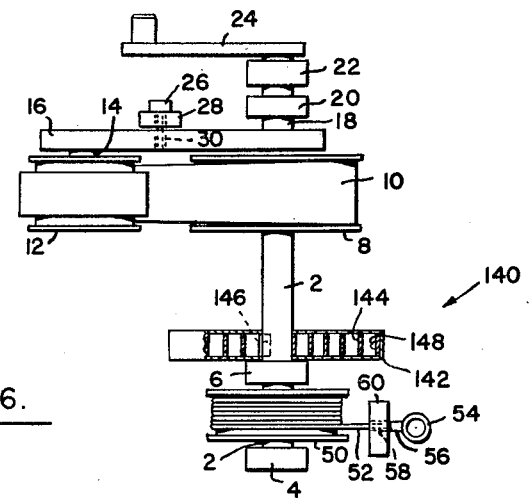
FIGURE 6 is a diagrammatic plan view partially broken away of an alternative embodiment of the invention.

Similarly, a power spring motor having a positive gradient equal and opposite to the "B" motor having a negative gradient may be substituted for the "B" motor having a positive gradient in the device of FIGURE 1, as is illustrated in FIGURE 6 where the parts corresponding to similar parts of the device of FIGURE 1 are given the same numerals. In this device, the positive gradient output force is provided by a conventional power spring motor 140 which has a casing 142 fixedly secured to support member 6 and a spiral power spring 144 having its inner end secured to shaft 2 as indicated at 146 and its outer end secured to casing 142 as indicated at 148 so that extension of cable 52 will wind up spring 144.

It will be understood that the above described embodiments are merely by way of illustration of the invention and are not intended to be limiting.

What is claimed is:

1. In combination a spring motor comprising a storage drum and a tightly coiled non-cumulative force ribbon spring coiled on said drum,
   output means connected to the spring,
   a second spring motor connected to the output means,
   said spring motors having substantially equal but opposite gradients to produce a substantially constant force,
   means to vary the force exerted by one of said motors independent of any change in the force exerted by the other spring motor and independent of any movement of the output means to change the substantially constant force to a new value.

2. The combination of claim 1 in which the second spring motor comprises a storage drum and a tightly coiled non-cumulative force ribbon spring coiled on said last mentioned storage drum.

3. The combination of claim 1 in which the ribbon spring is tapered.

4. The combination of claim 1 in which the second spring motor includes a power spring.

5. The combination of claim 1 in which the force of the spring motor with a negative gradient opposes the force exerted by the spring motor having a positive gradient.

6. The combination of claim 2 in which both of the springs are tapered.

7. The combination of claim 5 in which the ribbon spring is tapered.

8. The combination of claim 5 in which the second spring motor comprises a storage drum and a tightly coiled non-cumlative force ribbon spring.

9. The combination of claim 8 in which both of the springs are tapered.

10. In combination a spring motor comprising an output drum,
    a storage drum,
    said drums having spaced substantially parallel axes and a tightly coiled non-cumulative force ribbon spring connecting said drums and tending to uncoil from the output drum and to coil onto the storage drum,
    output means connected to the output drum,
    a second spring motor connected to the output means,
    said spring motors having substantially equal but opposite gradients to produce a substantially constant force, means to vary the force exerted by one of said motors independent of any change in the force exerted by the other spring motor and independent of any movement of the output means to change the substantially constant force to a new value.

11. The combination of claim 10 in which the second spring motor comprises a storage drum and a tightly coiled non-cumulative force ribbon spring coiled on said last mentioned storage drum.

12. The combination of claim 10 in which the ribbon spring is tapered.

13. The combination of claim 10 in which the second spring motor includes a power spring.

14. The combination of claim 10 in which the force of the spring motor with a negative gradient opposes the force exerted by the spring motor having a positive gradient.

15. The combination of claim 11 in which both of the springs are tapered.

16. The combination of claim 14 in which the ribbon spring is tapered.

17. The combination of claim 14 in which the second spring motor comprises an output drum and a storage drum having spaced substantially parallel axes, and a tightly coiled non-cumlative force ribbon spring connecting said last mentionel output and storage drums and tending to uncoil from the last mentioned output drum and to coil onto the last mentioned storage drum.

18. The combination of claim 17 in which both of the springs are tapared.

No references cited

JULIUS E. WEST, *Primary Examiner.*